United States Patent
Hess et al.

(10) Patent No.: US 10,678,273 B2
(45) Date of Patent: Jun. 9, 2020

(54) PRESSURE-REGULATING VALVE

(71) Applicant: HYDAC FLUIDTECHNIK GMBH, Sulzbach/Saar (DE)

(72) Inventors: Maximilian Felix Hess, Saarbruecken (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 44 days.

(21) Appl. No.: 15/554,452

(22) PCT Filed: May 6, 2016

(86) PCT No.: PCT/EP2016/000744
§ 371 (c)(1),
(2) Date: Aug. 30, 2017

(87) PCT Pub. No.: WO2016/198140
PCT Pub. Date: Dec. 15, 2016

(65) Prior Publication Data
US 2018/0039291 A1 Feb. 8, 2018

(30) Foreign Application Priority Data

Jun. 11, 2015 (DE) .................. 10 2015 007 689

(51) Int. Cl.
*G05D 11/00* (2006.01)
*G05D 16/10* (2006.01)
(Continued)

(52) U.S. Cl.
CPC ......... *G05D 16/106* (2013.01); *F15B 13/024* (2013.01); *F15B 13/025* (2013.01);
(Continued)

(58) Field of Classification Search
CPC .................................................. Y10T 137/261
See application file for complete search history.

(56) References Cited

U.S. PATENT DOCUMENTS 2,522,913 A * 9/1950 Westman ............... G05D 16/10
137/116.5
2,731,975 A * 1/1956 Boals .................... G05D 16/10
137/116.5
(Continued)

FOREIGN PATENT DOCUMENTS

DE  43 04 117     8/1994
DE  199 32 747    4/2000
(Continued)

OTHER PUBLICATIONS

International Search Report (ISR) dated Aug. 1, 2016 in International (PCT) Application No. PCT/EP2016/000744.

*Primary Examiner* — Robert K Arundale
(74) *Attorney, Agent, or Firm* — Wenderoth, Lind & Ponack, L.L.P.

(57) ABSTRACT

A pressure-regulating valve has a valve piston (10) subjected to the action of an energy store and guided longitudinally in a valve housing (12). The valve housing has a supply port (14), a utility port (16) and a tank port (18) actuated by a control part (20) closing with a sealing action. In connecting from the supply port to the utility port, a pressure reduction function is realized. In a fluidic connection from the utility port to the tank port, a pressure-limiting function is realized. The control part (20) has a control rod (22) with two control bodies (24, 26) spaced apart from one another. One control body (24) controls the connection between supply port (14) and utility port (16). The other control body (26) controls the connection between utility port (16) and tank port (18).

17 Claims, 2 Drawing Sheets

(51) Int. Cl.
*F15B 13/02* (2006.01)
*F16K 17/04* (2006.01)
*F15B 13/04* (2006.01)

(52) U.S. Cl.
CPC .......... *F15B 13/0405* (2013.01); *F16K 17/04* (2013.01); *F16K 17/048* (2013.01); *F16K 17/0473* (2013.01); *Y10T 137/261* (2015.04)

(56) References Cited

U.S. PATENT DOCUMENTS

| | | | | | |
|---|---|---|---|---|---|
| 2,777,458 | A | * | 1/1957 | Stern | G05D 16/10 137/116.5 |
| 2,879,783 | A | * | 3/1959 | Taplin | G05D 16/0672 137/116.5 |
| 3,086,548 | A | * | 4/1963 | Galiger | G05D 16/0613 137/116.5 |
| 3,282,285 | A | * | 11/1966 | Hanson | G05D 16/0663 137/116.5 |
| 3,420,257 | A | * | 1/1969 | Lansky | G05D 16/0663 137/116.5 |
| 3,456,915 | A | * | 7/1969 | Smolen | F16K 1/42 137/116.5 |
| 3,621,867 | A | * | 11/1971 | Johnson | F16K 17/085 137/116.5 |
| 3,658,082 | A | * | 4/1972 | DiTirro | G05D 16/10 137/116.5 |
| 3,699,998 | A | * | 10/1972 | Baranowski, Jr. | G05D 16/0663 137/327 |
| 3,906,982 | A | * | 9/1975 | Fleischhacker | G05D 16/0666 137/116.5 |
| 3,926,204 | A | * | 12/1975 | Earl | G05D 16/02 137/116.5 |
| 4,171,004 | A | * | 10/1979 | Cerrato | G05D 16/0663 137/115.14 |
| 4,596,264 | A | * | 6/1986 | Gladstone | G05D 16/2086 137/116.5 |
| 4,732,077 | A | * | 3/1988 | Schweikert | B60G 17/052 137/116.3 |
| 5,370,152 | A | * | 12/1994 | Carey | G05D 16/2095 137/487.5 |
| 5,452,741 | A | * | 9/1995 | Tomita | G05D 16/10 137/116.5 |
| 5,586,569 | A | * | 12/1996 | Hanning | G05D 16/0663 137/116.5 |
| 5,924,443 | A | * | 7/1999 | Wohlfahrt | F16K 17/06 137/116.5 |
| 5,931,182 | A | | 8/1999 | Craft et al. | |
| 6,068,014 | A | * | 5/2000 | Tomita | G05D 16/0666 137/116.5 |
| 2001/0009161 | A1 | * | 7/2001 | Berger | G05D 16/0663 137/116.5 |
| 2002/0078993 | A1 | * | 6/2002 | Collado | F16K 17/065 137/116.5 |
| 2003/0106584 | A1 | * | 6/2003 | Neff | G05D 16/10 137/116.5 |
| 2010/0147400 | A1 | * | 6/2010 | Hawkins | F16K 17/105 137/484.4 |

FOREIGN PATENT DOCUMENTS

| | | |
|---|---|---|
| DE | 10 2005 058 846 | 6/2007 |
| EP | 1 970 787 | 9/2008 |
| WO | 2011/124394 | 10/2011 |
| WO | 2013/090458 | 6/2013 |
| WO | 2015/039734 | 3/2015 |

\* cited by examiner

PRESSURE-REGULATING VALVE

FIELD OF THE INVENTION

The invention relates to a pressure-regulating valve having a valve piston subjected to the action of an energy store and guided in a longitudinally displaceable manner in a valve housing. The valve housing has connection points, such as a supply connection, a utility connection and a tank connection. The connections can be actuated by a control part that closes in a seat-tight manner. In the case of a fluidic connection from the supply connection to the utility connection, a pressure reduction function is realized. In the case of a fluidic connection from the utility connection to the tank connection, a pressure-limiting function is realized.

BACKGROUND OF THE INVENTION

Pressure-regulating valves are frequently used in a hydraulic circuit for the purpose of converting a variable primary pressure, which is often applied from a pump or a hydraulic accumulator as the pressure source to a supply connection of the valve, into a constant, reduced secondary pressure. In addition, the increase in the secondary pressure at the assignable utility connection of the regulating valve resulting from external and application-specific influences is prevented with an additional pressure release to an additional fluidic connection of the valve, commonly in the form of a tank connection or return connection. The design as a seat-tight pressure-regulating valve ensures the sealing of the connection from the primary pressure side to the regulating pressure side or from the regulating pressure side to the tank connection or return connection of the valve. In this way, once a static regulating pressure has been obtained, an increase in this pressure is prevented by the sealing relative to the primary pressure side. The reduction in pressure by the relief function commences only once a maximum pressure level is exceeded. The seat-tight construction of a pressure-regulative valve differs from the slide construction, in which the opening cross sections of the through-flow directions are obtained by the axial displacement of a valve piston in a valve body provided with radial bores.

One example of this type of pressure-regulating valve is disclosed in EP 1 970 787 B1. This known pressure-regulating seat valve for hydraulic systems, in particular for machine tool clamping devices, is provided with a main seat arranged between a supply pressure connection and a regulating pressure connection in the form of a utility connection. An upstream spring-loaded main closure element is assigned to the utility connection, for the purpose of setting the regulating pressure by the main seat, and can be mechanically loaded by a regulating piston that, downstream of the seat, is loaded by the regulating pressure against a regulating spring. Because in the known solution a discharge valve with a seat valve construction is arranged in a flow path between the regulating pressure connection and a discharge connection or tank connection, which discharge valve can be mechanically controlled to the discharge connection when the regulating pressure set by the regulating spring is exceeded until such time as the regulating pressure is restored, and because the activation of both the discharge valve and of the main closure element can be set by the regulating spring, a three-way pressure-regulating seat valve is realized. This valve requires only a single setting opportunity for the regulating pressure setting, namely, for the preloading of the regulating spring. This advantage is achieved in particular by the integration of the flow path to the discharge connection and of the discharge valve with a seat valve construction into the flow path, and with the single regulating spring that acts both for the discharge valve and the main seat valve.

SUMMARY OF THE INVENTION

On the basis of this prior art, the invention addresses the problem of producing a functionally-reliable pressure-regulating valve in an inexpensive manner, which pressure-regulating valve, in addition to a pressure reduction function, also realizes a pressure-limiting function, with the pressure difference between the respective reduced pressure and the pressure-limiting opening pressure being minimized in order to thus ensure an energy-saving pressure-regulating valve operation. In particular, a maximum regulating pressure variation is to be achieved due to the pressure sensitivity of the connected consumer.

This problem is basically solved by a pressure-regulating valve including a control part having a control rod with two control bodies that are kept at a distance from one another. One of the control bodies controls at least one fluidic connection between the supply connection and the utility connection. The other control body controls at least one fluidic connection between the utility connection and the tank connection. A 3-way pressure regulating valve is then created that, with a functionally-reliable and inexpensive construction, expands a pressure reduction function with which it is provided to also include a pressure-limiting function. Both the pressure reduction function and the pressure-limiting function can be appropriately regulated by a single regulating pressure spring. The pressure-regulating valve according to the invention is preferably used in hydraulic clamping of machine tools. Due to the additional pressure-limiting function, it ensures maintenance of the clamping pressure in the case of pressure increases due to external influences.

Compared with the known comparable valve solutions, the valve according to the invention has the advantage that the pressure offset or the pressure difference between the respective reduced pressure and the assignable pressure-limiting opening pressure of the valve is minimal, which results in an energy-saving operation. In particular, hydraulic consumers connected to the pressure-regulating valve, such as clamping pressure units in the case of machine tools, can be actuated in an unhindered and direct manner, which also represents a significant safety enhancement. Because the valve construction according to the invention is formed in a seat-tight manner, undesirable leaks during valve operation are avoided. The respective workpiece is appropriately protected even when a high clamping force is applied. In this way, leak losses cannot result in a corresponding clamping pressure loss in the hydraulic clamping of the machine tool.

According to the invention, the control bodies of the control part, which are respectively responsible for this functioning are firmly connected to one another via a control rod and are kept at a distance from one another. Both the pressure reduction function and the pressure-limiting function can then be realized with only one control part in an installation space-saving manner, with the forced coupling of the two control bodies via the control rod ensuring a fail-safe operation.

Due to the direct coupling by the single-piece control part between the pressure-regulating seat in the valve housing and the pressure-limiting seat, no additional idle stroke is required in the valve piston via the control part with its control rod and the two control bodies in order to activate the pressure-limiting function. The pressure difference between regulated pressure and limited pressure in the sealing regulating position is minimal because no additional sealing force is required to overcome a certain idle stroke. However, in order to open the pressure-limiting function, the loss of the compressive force, which is transferred via the closing piston from the primary pressure side, must be compensated for.

In a particularly advantageous manner, a change in the seat diameter of the valve piston makes it possible to change the pressure difference until such time as the pressure-limiting function is activated.

The control part formed according to the invention, with the control rod and the two control bodies that are kept at a distance from one another by the control rod, then creates a double-action sealing element. Due to the gimbal-type mounting of the two control bodies in the form of spherical caps in the respective seat geometries of the assignable valve seats on the valve housing and on the valve piston, a tolerance insensitivity is produced with regard to form tolerance and positional tolerance of the valve components that are to this extent connected to one another. This arrangement ensures a high level of tightness for the pressure-reduction function and for the pressure-limiting function.

Furthermore, the gimbal mounting provided ensures that the critical loading case of the piston-type closing part with its two control bodies is reduced to pulsating compressive loads. This mounting permits a reduction in the rod diameter of the control rod in the region of the seat feed-through in the valve housing and provides additional advantages in reducing the pressure losses in the case of unloaded through-flow of the pressure-regulating valve. Advantageously, the tank connection, return connection or discharge connection of the pressure-limiting function is arranged above the valve piston at the side on the valve housing, in which the valve piston is guided in a longitudinally displaceable manner. This arrangement permits atmospheric pressure to the spring side of the valve piston and to the spring chamber with the regulating pressure spring accommodated therein, so that to this extent the actual pressure-regulating function is then virtually independent of the pressure in the discharge line, return line or tank line. The pressure existing in the tank line acts, as a compressive force, against the valve piston on the surface of the pressure-limiting seat, which is arranged in the region of the free front end of the valve piston, which in turn faces the control part.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure that are schematic and not to scale.

DETAILED DESCRIPTION OF THE INVENTION

Figure 1:
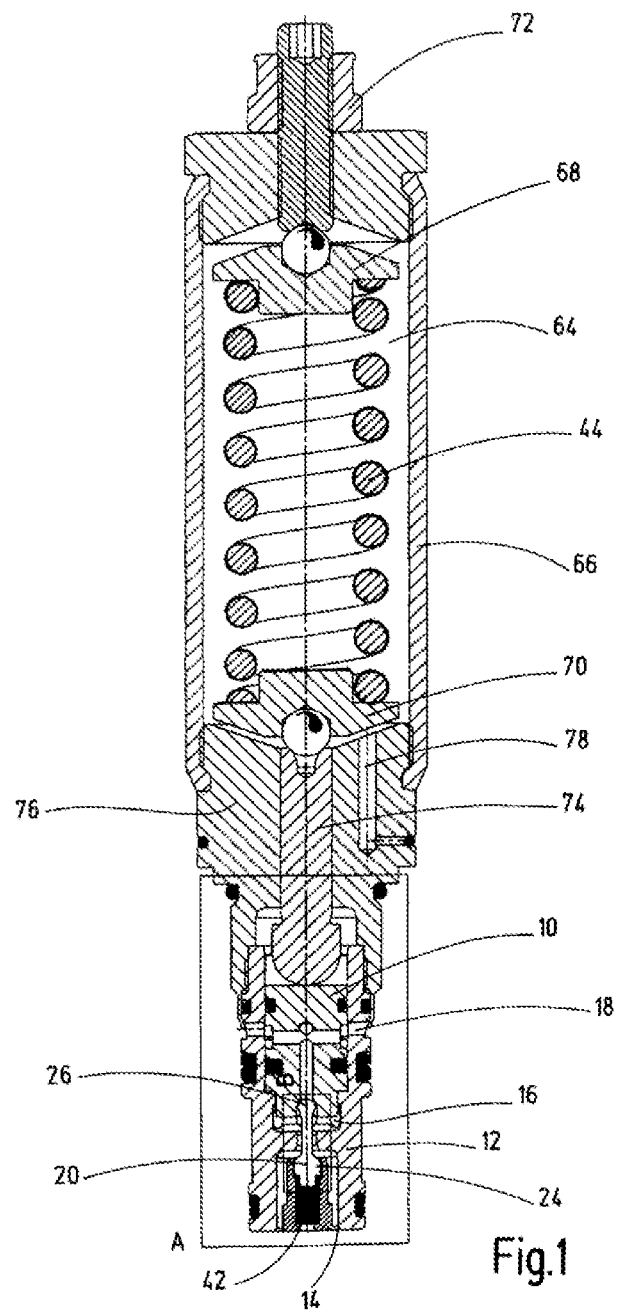
FIG. 1 is a side view in section through a pressure-regulating valve according to an exemplary embodiment of the invention.

The pressure-regulating valve depicted in FIG. 1 has a valve piston 10, which is guided in a longitudinally displaceable manner in a valve housing 12. The valve housing 12 has different connection points that can be separated from one another, such as a supply connection or port 14, a utility connection or port 16 and a tank connection or port 18. The respective connection points can be formed of several individual bores, with the supply connection 14 entering the valve housing 12 at the front end and both the utility connection 16 and the tank connection 18 being introduced laterally in a radial direction into the valve housing 12, as depicted in FIG. 1. The supply connection 14, which is also referred to as a "supply pressure connection" or "pump pressure connection" in technical parlance, serves to deliver a supply pressure, for example a pump pressure or a hydraulic accumulator pressure, to the inside of the valve housing 12 of the pressure-regulating valve. The primary pressure side or primary pressure connection 14 are technical descriptions that are also commonly used. The utility connection 16 leads to a hydraulic consumer, which is not depicted in detail, for example in the form of a hydraulic clamping cylinder of a clamping device in the case of a machine tool. For the utility connection 16, the terms "secondary connection" or "secondary pressure side" are also used. The terms "regulating pressure side" or "consumer connection" are also common. The term tank connection 18 is also commonly described as a "return connection or discharge connection" in technical parlance. The above-mentioned terms are to this extent categorized and reference is made to them to this extent below.

Figure 2:
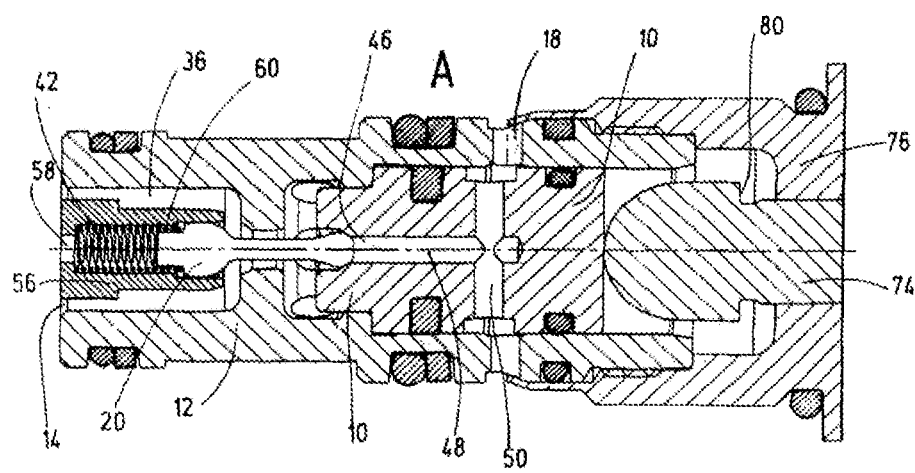
FIG. 2 is an enlarged partial side view in section of the valve of FIG. 1 on a magnified scale (3:1) relative to FIG. 1 of segment identified with the letter A in FIG. 1.
Figure 3:
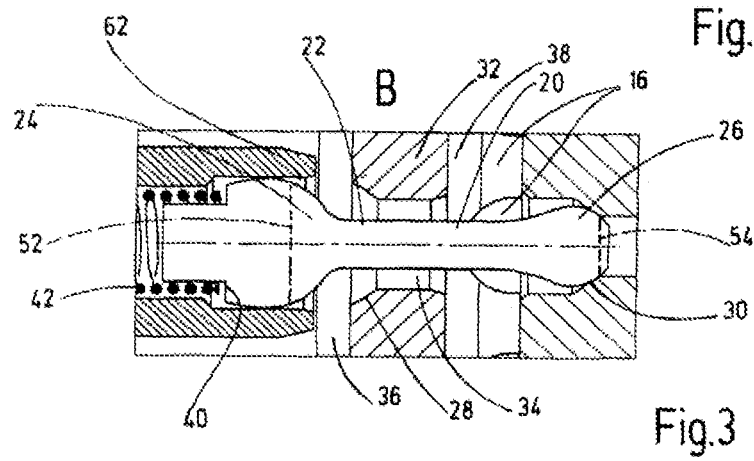
FIG. 3 is an enlarged side view in section of a segment of the valve of FIG. 1 on a magnified scale (6:1) relative to FIG. 1 identified with the letter B in FIG. 2.

A control part 20 serves to actuate the connections or connection points, which control part is depicted magnified or enlarged in FIGS. 2 and 3 and which can close in a seat-tight manner. The control part 20 can be actuated in such a way that, in the case of a fluidic connection from the supply connection 14 to the utility connection 16, a pressure reduction function is realized, and in the case of a fluidic connection from the utility connection 16 to the tank connection 18, a pressure-limiting function is realized, which functions combined permit a pressure-regulating function.

As is shown in particular in FIG. 3, the control part 20 has a control rod 22 with two control bodies 24, 26 kept at a distance from one another. One or first control body 24 controls at least the fluidic connection between the supply connection 14 and the utility connection 16. The other or second control body 26 controls at least the fluidic connection between the utility connection 16 and the tank connection 18. The one control body 24 of the control part 20 can be brought into seat-tight contact with a first valve seat 28 of the valve housing 12, which valve seat is penetrated by the control rod 22. The other control body 26 of the control part 20 is able to be brought into seat-tight contact with a second valve seat 30 of the valve piston 10. According to the depictions of FIGS. 1 to 3, the second control body 26 is in its right-hand stop position, and thus, is arranged in a sealing manner on its assigned second valve seat 30 in the valve piston 10. While the first valve seat 28 is designed with a spherical shape and conically tapered, the second valve seat 30 has a comparable conical taper with angular surfaces that extend straight. These tapered surfaces of the first and second valve seats 28, 30 are tapered in directions away from the respective control bodies.

The control rod 22 penetrates, at a radial distance, a transverse partition wall 32 in the valve housing 12 via a penetration point 34 that opens into the first valve seat 28 at its left-hand end when viewed in the direction of viewing of FIG. 3. The broadest diameter point of the first valve seat 28 is flush with the left-hand front wall of the partition wall 32 of the valve piston 10. The diameter of the penetration point 34 is in any case selected such that, when the entire valve is assembled, the second control body 26 can also pass through this penetration point 34 in order to subsequently cooperate with the valve piston 10 when the valve has been fully assembled. Furthermore, the partition wall 32 divides the valve housing into two fluid chambers 36, 38. The first or supply chamber 36 is connected in fluid communication to the supply connection 14. The other or second or utility fluid chamber 38 is connected in fluid communication to the utility connection 16. Depending on the respective displacement position of the control part 20 and the valve piston 10, the volumes of the respective fluid chambers 36, 38 can vary within predefinable limits.

The first control body 24 is supported at its left-hand end by a step 40 on an energy store in the form of a control pressure spring 42, which is penetrated by the fluid supply at the supply connection 14. The spring stiffness of spring 42 is significantly less than the spring stiffness of a regulating pressure spring 44, which permanently applies pressure to the valve piston 10 in each of its regulating positions and which likewise constitutes an energy store.

As can be seen in particular from the detail drawing according to FIG. 2, the valve piston 10 has an internal ducting or duct 46 with a longitudinal bore 48 and a transverse bore 50. The longitudinal bore 48 opens into the second valve seat 30 by its one free end, and by its other free end it opens into the transverse bore 50. Transverse bore 50 in turn opens at its ends in the region of the bores for the tank connection 18. The axial length of the control part 20 and the valve piston 10 is dimensioned such that, in any case when viewed in the viewing direction of FIGS. 2 and 3, in the left-most displacement position of the valve piston 10, the control part 24 arrives, by its step, at a corresponding stop location. In this stop position too, at least the transverse bore 50 is still partially in a fluid-conducting overlap with the tank connection 18 in the valve housing 12. The internal ducting 46 in the valve piston 10 with the longitudinal bore 48 and the transverse bore 50 permits at least a fluid-conducting connection between the utility connection 16 and the tank connection 18 as soon as the second control body 26 of the control part 20 lifts out of its assigned second valve seat 30 in the valve piston 10.

The two control bodies 24, 26 each have spherical shaped body sections in the form of partial spherical caps. In FIG. 3 the sealing lines for the two control bodies 24, 26 are represented with dashed lines and identified with the reference numerals 52 and 54. It can also be seen, in particular from FIG. 2, that the second control body 26 of the control part 20 assigned to the valve seat 30 on the valve piston 10 is smaller in diameter relative to its circumferential sealing line 54, preferably approximately ⅓ to a half smaller, particularly preferably precisely half as small, than the first control body 24 that faces the supply connection 14 with its diameter related to its sealing line 52. This arrangement in any case results in a seat-tight construction in that there is always one of the two control bodies 24, 26 contacting on its assigned valve seat 28, 30 or, if appropriate, both control bodies 24, 26, depending on the respective displacement position of the valve piston 10. There is also the possibility that both control bodies 24, 26 are distanced from their respective assigned valve seat 28, 30 if this is required for the regulating tasks of the pressure-regulating valve.

The valve housing 10 has, in the region of the supply connection 14 and connected thereto in a fluid-conducting manner, a recess in the form of the first fluid chamber 36, into which a holding device 56 is inserted for receiving the pressure spring 42, on which spring 42 the one control body 24 of the control part 20 is supported. The holding device 56 is formed as a receiving pot and is inserted via connecting bars (not depicted) into the fluid chamber 36 of the valve housing 12 in such a way that a radial distance is formed between the inner wall of the fluid chamber 36 and the outer wall of the holding device 56 to permit the entry of pressurized fluid in the direction of the valve piston 10. Furthermore, the holding device 56 has on its bottom side a through hole 58, which opens into a channel 60 that fully penetrates the holding device 56 viewed in the longitudinal direction. In the region of the dome-shaped broadening of the first control body 24, this channel 60 is likewise correspondingly broadened and to this extent forms a cavity 62 for the purpose of receiving the control body 24. As shown in FIGS. 2-3, the ball-shaped first control body 20 contacts holding device 56.

If the valve piston 10 is, in accordance with the depiction of FIG. 2, in its left-hand end position, the valve piston abuts, by a frontal, step-shaped broadening, an internal wall shoulder of the valve housing 12. This step serves as a stroke stop for the valve piston 10. The necessary sealing is realized by standard soft sealing.

The regulating pressure spring 44 for the valve piston 10 is guided, according to the depiction of FIG. 1, in a spring chamber 64, which is surrounded by parts 66 of the valve housing 12 and pressurized with ambient pressure. The pressure spring 44 is supported at each of its two free ends on an assigned cap guide 68, 70. The spring force of the pressure spring 44 can be set by a standard setting device 72, which acts by a ball guide on the top cap guide 68. The bottom cap guide 70 is in turn in a functional connection with an actuation tappet 74 via a ball bearing. The actuation tappet penetrates a connection piece 76 as an additional part of the valve housing 12. The valve housing part 66 is dovetailed at the ends with wall parts of the setting device 72 and with the connection piece 76. A pressure equalizing channel 78 is arranged in the connection piece 76 and conveys the ambient pressure or atmospheric pressure to the inside of the spring chamber 64. At the location where, viewed in the viewing direction of FIG. 1, the bottom end of the actuation tappet 74 emerges from the connection piece 76, the connection piece 76 has a thread support for the screwing of the valve housing part 12. Furthermore, to achieve a rigid connection between the valve housing 12 and the connection piece 76, the bottom free end of the connection piece 76 is flanged in the direction of the outer wall of the valve housing 12.

As can also be seen from FIG. 2, the actuation tappet 74 has a stop 80 on its side facing away from the valve piston 10 for engaging the housing parts in the form of the connection piece 76. This stop 80 limits the free travel of the valve piston 10 in the direction of its regulating pressure spring 44. Furthermore, the entire pressure-regulating valve, including its guide systems and sealing systems, which will not be described in further detail here, is designed using the cartridge construction, which makes it possible to insert the pressure-regulating valve into an assignable valve block (not depicted) of a complete hydraulic system in an evident manner.

Figure 4:
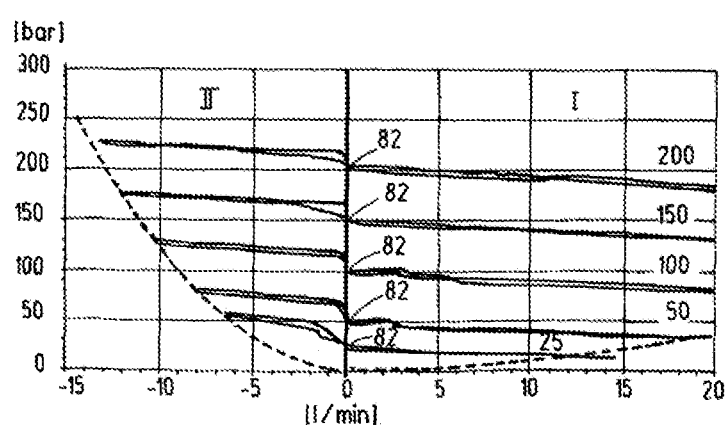
FIG. 4 is a graph in the form of noted measurements, the volume flow-dependent pressure regulating function with quadrant change that can be realized with the pressure-regulating valve according to FIGS. 1 to 3.

The regulating function of the pressure-regulating valve according to the invention can be graphically represented with the aid of the diagram of FIG. 4 in two quadrants I and II. The noted measurements according to FIG. 4 are merely an exemplary representation intended to illustrate the ratios in the quadrant operation to be regulated. The ordinate of the diagram of FIG. 4 gives the secondary pressure in bar. The abscissa gives the volume flow in l/min. The transverse lines identified with 25, 50, 100, 150 and 200 represent pressure stages in bar.

The first quadrant I presents the regulated, in particular reduced pressure in a defined valve setting of the pressure-regulating valve according to the invention dependent on the volume flow. Upon transition into the second quadrant II, the delivery volume from the primary side 14 towards the secondary side 16 drops to zero. The closing operation of the regulating element responsible for this drop is realized with the seat-tight closing element 20 with the cap-shaped control bodies 24, 26. This operation ensures that, once the regulated pressure and the zero-volume flow intake are achieved at the secondary connection 16, no fluid can flow from the primary side 14 to the secondary side 16 and produce an undesirable pressure increase. If the pressure increases with a closed regulating element, the pressure-limiting function to the tank connection or discharge connection 18 opens in the second quadrant II. This pressure-limiting function also operates using a specified volume flow range.

This function has applications for example in hydraulic clamping of machine tools. The supply pressure of a hydraulic system is reduced to the desired clamping pressure, which is responsible for realizing the clamping of a workpiece by hydraulic cylinders. When the desired preloading of the cylinder is achieved, the control part 30 in the form of the first control body 24 seals the primary pressure side 14 (supply pressure side) relative to the secondary pressure side (clamping pressure side) 16. During the machining of the then firmly clamped workpiece, temperature increases or machining forces can result in pressure increases on the secondary pressure side 16. This pressure increase is dissipated without an additional valve via the pressure-limiting function in the pressure-regulating valve according to the invention. The important thing here is that the regulated primary pressure at the supply connection 14 and the opening pressure of the pressure-limiting function can both be set by means of a spring, in this case the regulating pressure spring 44, which spring acts upon the regulating element in the form of the valve piston 10 and pushes against the primary pressure. The goal here is to maintain as low as possible the pressure difference between regulated pressure at zero-volume flow and the opening pressure of the pressure-limiting function, irrespective of the setting pressure of the valve according to the invention, which is represented in a schematic manner in FIG. 4 by pressure offset ranges 82 for the individual pressure stages 25 to 200 bar at the zero-volume flow line.

By comparison with the prior art, the pressure-regulating valve solution according to the invention then provides a valve in which the shown pressure offset range 82 between reduced pressure and pressure-limiting opening pressure is minimal, and this constitutes a significant safety feature when using the pressure-regulating valve according to the invention, in particular in the context of hydraulic clamping of machine tools. The advantages of the valve thus include the energy efficiency when used in hydraulic clamping of machine tools due to the seat-tight construction by comparison with pressure-regulating valves with a slide construction, in particular no losses resulting from long-lasting leak flow occur in the solution according to the invention.

While one embodiment has been chosen to illustrate the invention, it will be understood by those skilled in the art that various changes and modifications can be made therein without departing from the scope of the invention as defined in the claims.

The invention claimed is:
1. A pressure-regulating valve, comprising:
a valve housing having a supply connection, a utility connection and a tank connection, and having a longitudinal axis;
a valve piston guided for longitudinal displacement in said valve housing connecting said utility connection selectively to said supply connection and said tank connection;
an energy store biasing said valve piston, said energy store including a regulating pressure spring in said valve housing permanently applying a pressure to said valve piston in each regulating position of said valve piston, said regulating pressure spring being guided in a spring chamber surrounded by parts of said valve housing and pressurized with ambient pressure, said regulating pressure spring acting on a first end of an actuation tappet, an opposite second end of said actuation tappet directly contacting said valve piston, said actuation tappet being guided for longitudinal movement along said longitudinal axis in a connection piece that is a part of said valve housing;
a control part closable in a fluid-tight contact selectively with first and second valve seats in said valve housing providing a pressure reduction function when said supply connection and said utility connection are connected in fluid communication and providing a pressure-limiting function when said utility connection and said tank connection are connected in fluid communication, said control part having first and second control bodies, said first and second control bodies being fixedly connected to one another and spaced from one another by a control rod such that said first and second control bodies and said control rod cannot move relative to one another, and being engagable with said first and second valve seats, respectively, said first control body controlling fluid communication between said supply connection and said utility connection, said second control body controlling fluid communication between said utility connection and said tank connection, said second valve seat being on said valve piston, said first control body is supported and biased toward contact with said first valve seat by a control pressure spring and by fluid pressure from said supply connection, said control pressure spring being coaxially aligned with said supply connection along said longitudinal axis and having a fluid passage extending therethrough and being open in fluid communication with said supply connection in all positions of said control part, said control pressure spring having a spring stiffness lower than a spring stiffness of said regulating pressure spring;
a partition wall extending radially relative to said longitudinal axis in said valve housing between a supply chamber connected in fluid communication with said supply connection and a utility chamber connected in fluid communication with said utility connection, said supply chamber and said utility chamber being spaced axially from one another along said longitudinal axis; and a penetration passage extending axially along said longitudinal axis in said partition wall, said control rod extending axially along said longitudinal axis through said penetration passage and said first valve seat at a radial distance from surfaces of said partition wall and said first valve seat defining seat partition passage and said first valve seat, said first valve seat being on said partition wall and surrounding said penetration passage.

2. A pressure-regulating valve according to claim 1 wherein
said supply chamber and said utility chamber are directly on opposite sides of said partition wall.

3. A pressure-regulating valve according to claim 1 wherein
said penetration passage is the sole passage in said partition wall.

4. A pressure-regulating valve according to claim 1 wherein
said valve piston comprises internal ducting permitting fluid communication between said utility connection and said tank connection upon said second control body lifting off of said second valve seat.

5. A pressure-regulating valve according to claim 1 wherein
said second control body is smaller in diameter at a circumferential sealing line thereof transverse to said longitudinal axis than a diameter of said first control body at a circumferential sealing line thereof transverse to said longitudinal axis.

6. A pressure-regulating valve according to claim 5 wherein
said diameter of said second control body is one third to one half of said diameter of said first control body.

7. A pressure-regulating valve according to claim 1 wherein
said valve housing comprises a recess being at said supply connection, being connected to said supply connection in fluid communication and extending coaxially relative to said supply connection; and
a holding device is inserted in said recess and receives in a cavity of said holding device said control pressure spring at one end of said control pressure spring, an opposite end of said control pressure spring engaging said first control body.

8. A pressure-regulating valve according to claim 1 wherein
said actuation tappet comprises a stop engagable with said connection piece to limit free travel of said valve piston in a direction of said regulating pressure spring.

9. A pressure-regulating valve according to claim 1 wherein
said valve housing comprises a cartridge construction insertable into a valve block of a hydraulic system.

10. A pressure-regulating valve according to claim 1 wherein
said supply connection is a hydraulic supply connection;
said utility connection is a hydraulic utility connection;
said tank connection is a hydraulic tank connection.

11. A pressure-regulating valve according to claim 1 wherein
said supply connection opens in an axial direction along said longitudinal axis; and said utility connection and said tank connection open in lateral directions transverse to said longitudinal axis.

12. A pressure-regulating valve according to claim 1 wherein
said first and second control bodies have ball-shaped sealing surfaces that engage the respective first and second valve seats.

13. A pressure-regulating valve according to claim 1 wherein
said actuating tappet comprises a stop facing away from said valve piston and being engageable with part of said valve housing in a manner limiting free travel of said valve piston in a direction of said energy store.

14. A pressure-regulating valve, comprising:
a valve housing having a supply connection, a utility connection and a tank connection, and having a longitudinal axis;
a valve piston guided for longitudinal displacement in said valve housing connecting said utility connection selectively to said supply connection and said tank connection;
an energy store biasing said valve piston;
a control part closable in a fluid-tight contact selectively with first and second valve seats in said valve housing providing a pressure reduction function when said supply connection and said utility connection are connected in fluid communication and providing a pressure-limiting function when said utility connection and said tank connection are connected in fluid communication, said control part having first and second control bodies, said first and second control bodies being fixedly connected to one another and spaced from one another by a control rod extending between said first and second control bodies such that said first and second control bodies and said control rod cannot move relative to one another, and being engagable with said first and second valve seats, respectively, said first control body controlling fluid communication between said supply connection and said utility connection, said second control body controlling fluid communication between said utility connection and said tank connection, said second valve seat being on said valve piston, said first control body is supported and biased toward contact with said first valve seat by a control pressure spring and by fluid pressure from said supply connection, said control pressure spring being coaxially aligned with said supply connection along said longitudinal axis and having a fluid passage extending therethrough and being open in fluid communication with said supply connection in all positions of said control part, said first and second control bodies having sealing surfaces that engage the respective first and second valve seats, and sealing surfaces having diameters transverse to said longitudinal axis greater than a diameter of said control rod transverse to said longitudinal axis between said first and second control bodies;
a partition wall extending radially relative to said longitudinal axis in said valve housing between a supply chamber connected in fluid communication with said supply connection and a utility chamber connected in fluid communication with said utility connection, said supply chamber and said utility chamber being spaced axially from one another along said longitudinal axis; and
a penetration passage extending axially along said longitudinal axis in said partition wall, said control rod extending axially along said longitudinal axis through said penetration passage and said first valve seat at a radial distance from surfaces of said partition wall and said first valve seat defining seat partition passage and said first valve seat, said first valve seat being on said partition wall and surrounding said penetration passage.

15. A pressure-regulating valve, comprising:

a valve housing having a supply connection, a utility connection and a tank connection, and having a longitudinal axis;

a valve piston guided for longitudinal displacement in said valve housing connecting said utility connection selectively to said supply connection and said tank connection;

an energy store biasing said valve piston;

a control part closable in a fluid-tight contact selectively with first and second valve seats in said valve housing providing a pressure reduction function when said supply connection and said utility connection are connected in fluid communication and providing a pressure-limiting function when said utility connection and said tank connection are connected in fluid communication, said control part having first and second control bodies, said first and second control bodies being fixedly connected to one another and spaced from one another by a control rod such that said first and second control bodies and said control rod cannot move relative to one another, and being engagable with said first and second valve seats, respectively, said first control body controlling fluid communication between said supply connection and said utility connection, said second control body controlling fluid communication between said utility connection and said tank connection, said second valve seat being on said valve piston, said first control body is supported and biased toward contact with said first valve seat by a control pressure spring and by fluid pressure from said supply connection, said control pressure spring being coaxially aligned with said supply connection along said longitudinal axis and having a fluid passage extending therethrough and being open in fluid communication with said supply connection in all positions of said control part;

a partition wall extending radially relative to said longitudinal axis in said valve housing between a supply chamber connected in fluid communication with said supply connection and a utility chamber connected in fluid communication with said utility connection, said supply chamber and said utility chamber being spaced axially from one another along said longitudinal axis;

a penetration passage extending axially along said longitudinal axis in said partition wall, said control rod extending axially along said longitudinal axis through said penetration passage and said first valve seat at a radial distance from surfaces of said partition wall and said first valve seat defining seat partition passage and said first valve seat, said first valve seat being on said partition wall and surrounding said penetration passage; and a holding device is in said housing, said control part contacting said holding device with a ball-shaped surface of said first control body.

16. A pressure-regulating valve, comprising:

a valve housing having a supply connection, a utility connection and a tank connection, and having a longitudinal axis;

a valve piston guided for longitudinal displacement in said valve housing connecting said utility connection selectively to said supply connection and said tank connection;

an energy store biasing said valve piston;

a control part closable in a fluid-tight contact selectively with first and second valve seats in said valve housing providing a pressure reduction function when said supply connection and said utility connection are connected in fluid communication and providing a pressure-limiting function when said utility connection and said tank connection are connected in fluid communication, said control part having first and second control bodies, said first and second control bodies being fixedly connected to one another and spaced from one another by a control rod such that said first and second control bodies and said control rod cannot move relative to one another, and being engagable with said first and second valve seats, respectively, said first control body controlling fluid communication between said supply connection and said utility connection, said second control body controlling fluid communication between said utility connection and said tank connection, said second valve seat being on said valve piston, said first control body is supported and biased toward contact with said first valve seat by a control pressure spring and by fluid pressure from said supply connection, said control pressure spring being coaxially aligned with said supply connection along said longitudinal axis and having a fluid passage extending therethrough and being open in fluid communication with said supply connection in all positions of said control part, said first and second control bodies and said first and second valve seats are tapered with said first and second control bodies being tapered toward the respective valve seat and said first and second valve seats being tapered away from the respective control body;

a partition wall extending radially relative to said longitudinal axis in said valve housing between a supply chamber connected in fluid communication with said supply connection and a utility chamber connected in fluid communication with said utility connection, said supply chamber and said utility chamber being spaced axially from one another along said longitudinal axis; and a penetration passage extending axially along said longitudinal axis in said partition wall, said control rod extending axially along said longitudinal axis through said penetration passage and said first valve seat at a radial distance from surfaces of said partition wall and said first valve seat defining seat partition passage and said first valve seat, said first valve seat being on said partition wall and surrounding said penetration passage.

17. A pressure-regulating valve, comprising:

a valve housing having a supply connection, a utility connection and a tank connection, and having a longitudinal axis;

a valve piston guided for longitudinal displacement in said valve housing connecting said utility connection selectively to said supply connection and said tank connection;

a regulating spring in said valve housing biasing said valve piston;

a control part closable in a fluid-tight contact selectively with first and second valve seats in said valve housing providing a pressure reduction function when said supply connection and said utility connection are connected in fluid communication and providing a pressure-limiting function when said utility connection and said tank connection are connected in fluid communication, said control part having first and second control bodies, said first and second control bodies being fixedly connected to one another and spaced from one another by a control rod such that said first and second control bodies and said control rod cannot move relative to one another, and being engagable with said first and second valve seats, respectively, said first control body controlling fluid communication between said supply connection and said utility connection, said second control body controlling fluid communication between said utility connection and said tank connection, said second valve seat being on said valve piston, said first control body is supported and biased toward contact with said first valve seat by a control pressure spring and by fluid pressure from said supply connection, said control pressure spring having a spring stiffness lower than a spring stiffness of said regulating spring, said control pressure spring being coaxially aligned with said regulating spring;

a partition wall extending radially relative to said longitudinal axis in said valve housing between a supply chamber connected in fluid communication with said supply connection and a utility chamber connected in fluid communication with said utility connection, said supply chamber and said utility chamber being spaced axially from one another along said longitudinal axis;

a penetration passage extending axially along said longitudinal axis in said partition wall, said control rod extending axially along said longitudinal axis through said penetration passage and said first valve seat at a radial distance from surfaces of said partition wall and said first valve seat defining seat partition passage and said first valve seat, said first valve seat being on said partition wall and surrounding said penetration passage; and a spring chamber in said valve housing receiving said regulating pressure spring and pressurized with ambient pressure, said regulating pressure spring acting on a first end of an actuation tappet, an opposite second end of said actuation tappet directly contacting said valve piston, said actuation tappet being guided for longitudinal movement along said longitudinal axis in a connection piece that is a part of said valve housing.

* * * * *